US008539354B2

(12) United States Patent
Beswick et al.

(10) Patent No.: US 8,539,354 B2
(45) Date of Patent: Sep. 17, 2013

(54) METHOD AND APPARATUS FOR INTERACTIVELY SHARING VIDEO CONTENT

(75) Inventors: Antony Beswick, Hässelby (SE); Jeffrey Ridout, Sörberge (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 1140 days.

(21) Appl. No.: 12/059,705

(22) Filed: Mar. 31, 2008

(65) Prior Publication Data

US 2009/0249225 A1    Oct. 1, 2009

(51) Int. Cl.
*G06F 3/048* (2013.01)

(52) U.S. Cl.
USPC .......................................... 715/719; 725/37

(58) Field of Classification Search
USPC ......... 715/721–726, 752–753, 758, 756–757, 715/734, 748, 749; 379/242; 455/412.1; 725/37–44, 64
See application file for complete search history.

(56) References Cited

U.S. PATENT DOCUMENTS

| 2003/0055974 | A1* | 3/2003 | Brophy et al. ................. 709/227 |
| 2006/0171376 | A1* | 8/2006 | Schwarz ...................... 370/352 |
| 2007/0053343 | A1* | 3/2007 | Suotula et al. ................ 370/352 |
| 2007/0180135 | A1* | 8/2007 | Kenrick et al. ............... 709/231 |
| 2007/0230361 | A1* | 10/2007 | Choudhury .................... 370/250 |
| 2008/0077956 | A1* | 3/2008 | Morrison et al. ................ 725/38 |
| 2008/0262910 | A1* | 10/2008 | Altberg et al. ................. 705/14 |
| 2008/0263459 | A1* | 10/2008 | Altberg et al. ................ 715/757 |
| 2008/0266378 | A1* | 10/2008 | Ryu ........................... 348/14.02 |
| 2009/0080635 | A1* | 3/2009 | Altberg et al. ........... 379/216.01 |
| 2009/0158136 | A1* | 6/2009 | Rossano et al. ................ 715/232 |
| 2009/0164309 | A1* | 6/2009 | Mgrdechian et al. ........... 705/10 |
| 2009/0225725 | A1* | 9/2009 | Zhu ............................... 370/331 |

OTHER PUBLICATIONS

Author Unknown. "FunkyCall." Babson College Newsroom, Release date Feb. 9, 2007. Available at: http://www3.babson.edu/Newsroom/Releases/Hatcheryspring07.cfm.
Author Unknown. "About FunkyCall." Available at: http://www.funkycall.com/index.php?id=53.
Author Unknown. "3G-324M and IP Video." Internet article from NMS Communications. Available at: http://www.nmscommunications.com/DevPlatforms/OpenAccess/Technologies/3G324MandIPVideo/default.htm.
Author Unknown. "Video Telephony Services over 3G Networks." Internet article from Tech-On, Dec. 2005. Available at: http://techon.nikkeibp.co.jp/article/HONSHI/20061122/124194/.

(Continued)

*Primary Examiner* — Steven Sax
(74) *Attorney, Agent, or Firm* — Coats and Bennett, P.L.L.C.

(57) ABSTRACT

Teachings presented herein provide a method of sharing video content over one or more communication networks. In particular, a first user can initiate a "video push," wherein specified video content is delivered to a second user via a video call. Return video content from the second user is received over the video call. Sending the return video content to the first user allows the first user to observe the second user's reaction to the pushed video content, thereby enhancing the experience of sharing video content for both users. The return video content can be streamed back to the first user in real-time or near real-time, or can be buffered for non real-time return. Thus the outgoing leg of a video call pushes specified video content to a targeted user, and, advantageously, the incoming leg of the video call receives return video capturing the targeted user's reaction to the pushed video.

24 Claims, 3 Drawing Sheets

(56) References Cited

OTHER PUBLICATIONS

Author Unknown. "Back to the future as DoCoMo circuit-switches video to escape flat-rate market constraints." Internet article from i-mode Business Strategy. Available at: http://www.imodestrategy.com/2004/11/back_to_the_fut.html.

Orr, Eli. "Understanding the 3G-324M Spec: Part 1." Internet article from CommsDesign, Jan. 21, 2003. Available at: http://www.commsdesign.com/design_corner/OEG20030121S0009.

Orr, Eli. "Understanding the 3G-324M Spec: Part 2." Internet article from CommsDesign, Jan. 28, 2003. http://www.commsdesign.com/design_corner/OEG20030128S0010.

Myers, David J. Mobile Video Telephony for 3G Wireless Networks. McGraw-Hill, 2005, pp. 1-10.

Myers, David. J. Mobile Video Telephony for 3G Wireless Networks. McGraw-Hill, 2005, pp. 57-67 and 71-72.

Author Unknown. "How Would You Use Video Telephony?" Ericsson press release, Sep. 13, 2004. Available at: http://www.ericsson.com/de/presse/background/Nr_3_Video_Telephony_Evolution.pdf.

Jack, David. "Circuit-Switched Video Streaming for Handsets." Electronic Engineering Times—Asia, Nov. 1-15, 2006, pp. 1-2.

\* cited by examiner

METHOD AND APPARATUS FOR INTERACTIVELY SHARING VIDEO CONTENT

TECHNICAL FIELD

The present invention generally relates to video telephony, and particularly relates to interactive sharing of video content.

BACKGROUND

In an existing approach to video sharing, a first user sees a video clip or other video source that he or she believes would be of interest to a second user, and correspondingly sends some type of electronic message to the second user. Typically, the message includes a link to the video, or includes the video itself, thereby allowing the second user to view the video. In a PC environment, the procedure may involve the first user sending an e-mail to the second user, where the e-mail includes a URL of the video, or includes the video as a file attachment. Similarly, in mobile communication environments, the procedure may involve the first user sending a message linking to or encapsulating the video, e.g., an MMS message.

The overall process is somewhat disconnected in terms of interaction between the users. For example, feedback from the second user to the first user comes, if at all, in the form of a return e-mail or text message, or perhaps later in a telephone call between the users. There is no component of simultaneous enjoyment of the video between the users, nor is there any real-time or near real-time feedback from the second user to the first user, regarding his or her enjoyment of the video.

SUMMARY

Teachings presented herein provide a method of sharing video content over one or more communication networks. In particular, a first user can initiate a "video push," wherein specified video content is delivered to a second user via a video call. Return video content from the second user is received over the video call. Sending the return video content to the first user allows the first user to observe the second user's reaction to the pushed video content, thereby enhancing the experience of sharing video content for both users. The return video content can be streamed back to the first user in real-time or near real-time, or can be buffered for non real-time return.

Thus the outgoing leg of a (full duplex) video call pushes specified video content to a targeted user, and, advantageously, the incoming leg of the video call receives return video capturing the targeted user's reaction to the pushed video. In one or more embodiments, this arrangement advantageously allows web clients to identify video clips or other video sources for pushed delivery to targeted recipients, and allows for those web clients to receive return video of the targeted recipients' reactions to the pushed video. The return video can be delivered in real-time or near real-time, such as via a FLASH movie for web browser playback, or can be delivered later via email, etc.

In one embodiment, a video interactive voice response (IVR) system is configured to support the sharing of video content over one or more communication networks. The video IVR system includes one or more processing circuits that are configured to receive a push request initiated by a first user device requesting delivery of specified video content to a second user device that is configured to support video calls. The video IVR system is further configured to initiate a video call to the second user device responsive to said push request, and deliver the specified video content to the second user device over the video call, if the second user device accepts the video call. Further, the video IVR system is configured to receive return video content from the second user device over the video call that is captured by the second user device during playback of specified video content, and send the return video content to the first user device.

In another embodiment taught herein, a method of sharing video content over one or more communication networks includes receiving a push request initiated by a first user device targeting delivery of specified video content to a second user device, establishing a video call to the second user device, delivering the specified video content to the second user device and receiving return video from the second user device over the video call, and sending the return video content to the first user device. In at least one such embodiment, sending the return video content to the first user device comprises sending the return video content to the first user device via a packet data connection established with the first user device. Further, in one or more embodiments, receiving the push request initiated by the first user device comprises receiving the push request from a web server communicatively coupled to the first user device. It is contemplated herein to configure a video IVR system and an associated web server to support such a method and the numerous variations of the method that are contemplated herein.

However, the present invention is not limited to the above features and advantages. Indeed, those skilled in the art will recognize additional features and advantages upon reading the following detailed description, and upon viewing the accompanying drawings.

DETAILED DESCRIPTION

Figure 1:
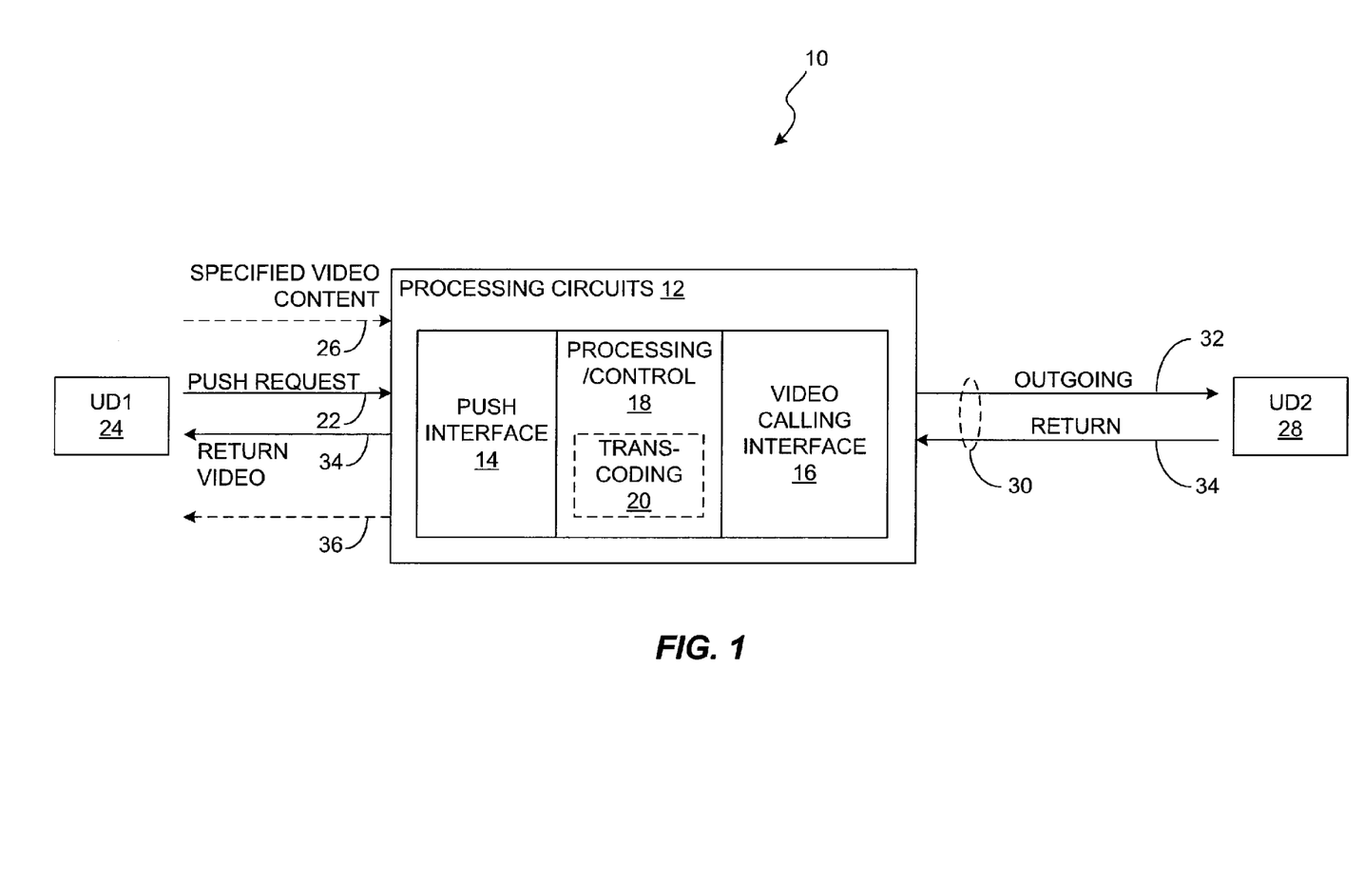
FIG. 1 is a block diagram of one embodiment of a video Interactive Voice Recorder (IVR) system that supports interactive video sharing as taught herein.

As a non-limiting example, FIG. 1 illustrates one embodiment of a video Interactive Voice Recorder (IVR) system 10, which is configured to support the sharing of video content over one or more communication networks. The illustrated video IVR system comprises one or more processing circuits 12, including a push interface 14, a video calling interface 16, and processing/control circuits 18, which optionally include transcoding circuits 20.

The processing circuits 12 may be implemented in hardware, software, or any combination thereof. In at least one embodiment, the processing circuits 12 include one or more microprocessor-based systems that are provisioned with one or more computer programs stored in memory, wherein the computer program(s) comprise program instructions that implement the described processing functionality upon their execution by the microprocessor-based system(s). As such, it will be appreciated that the circuit arrangements depicted for the video IVR system 10 may represent functional rather than physical circuit arrangements, and that functional variations are readily practiced via reprogramming, etc.

Figure 2:
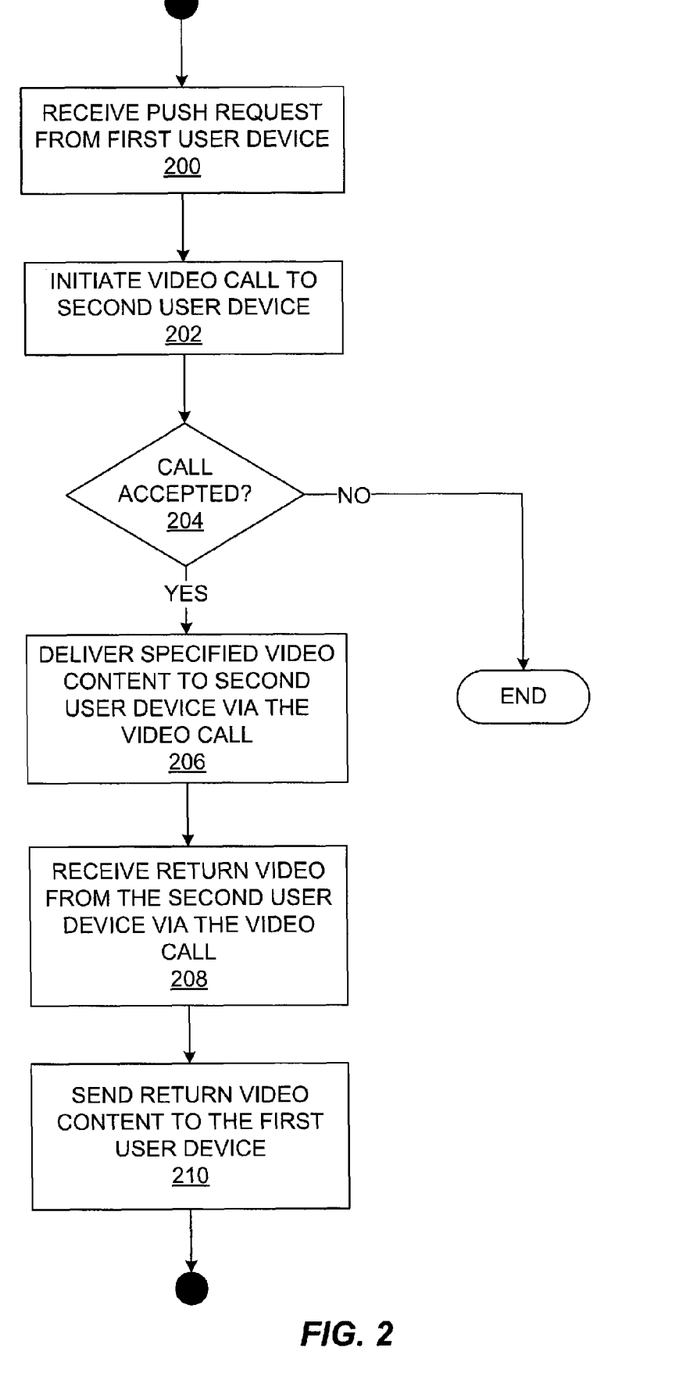
FIG. 2 is a logic flow diagram of one embodiment of processing logic implementing interactive video sharing.

As shown in FIG. 2, the processing circuits 12 of the video IVR system 10 are configured to implement a method of interactive video content sharing. More particularly, the processing circuits are configured to receive a push request 22 initiated by a first user device 24 requesting delivery of specified video content 26 to a second user device 28 that is configured to support video calls (Block 200). The second user device 28 may be, for example, a mobile station that supports video calls, i.e., full-duplex video links, using either circuit-switched or packet-switched connections. In one or more embodiments, the second user device 28 is configured to support circuit-switched video calls based on the 324M standards for video calling in Third Generation (3G) communication networks. In one or more other embodiments, the second user device 28 is configured to support packet-switched video calls.

In either case, the processing circuits 12 of the video IVR system 10 are further configured to initiate a video call 30 to the second user device 28 responsive to the push request 22 (Block 202), and to deliver the specified video content 26 to the second user device 28 over the video call 30 (as "outgoing" or "outbound" video content 32), if the second user device 28 accepts the video call 30 (perform Block 206 if "Yes" from Block 204, or end if "No" from Block 204). Note that ending call delivery at Block 204 may include additional processing, such as sending an indication of call refusal for receipt by the first user device 24.

Assuming acceptance of the video call by the second user device 28, however, the processing circuits 12 are configured to receive return video content 34 from the second user device 28 over the video call 30 (Block 208), and to send the return video content 34 to the first user device 24 (Block 210). The return video content 34 is captured by the second user device 28 during playback of specified video content. Thus, by returning the return video content 34 to the first user device 24, the user of the first user device 24 can see the reactions of the user of the second user device 28 as he or she views the specified video content 26 at the second user device 28. Put simply, the video IVR system 10 advantageously uses full-duplex video calling to push the specified video content 26 to the second user device 28 on the outbound leg of the video call, and correspondingly to receive on the inbound leg of the video call a return video 34 from the second user 28 that captures the second device user's reaction during viewing of the pushed video content. Doing so adds a new and mutually satisfying dimension to the more conventional practice of one user simply sending another user an e-mail or other message containing a link to a web video or some other video content of interest.

Still referring to FIG. 2, it should be understood that the actual processing carried out by the processing circuits 12 of the video IVR system 10 may not follow the illustrated processing sequence. Indeed, those skilled in the art will appreciate that the sequence shown in FIG. 2 is for discussion purposes but is not intended to limit the described processing. One or more processing functions may be performed in a different sequence and/or performed on a concurrent basis. For example, Blocks 206 and 208 may be performed concurrently, in the sense that the video call 30 supports two-way video with the second user device 28, allowing the video IVR system 10 to receive incoming return video content 34 while sending the specified video content 26 to the second user device 28 as outgoing video content 32. Further, the video IVR system 10 may, at the same time (real-time) or at nearly the same time (near real-time), stream the return video content 34 back to the first user device 24. Alternatively, the video IVR system 10 buffers the return video content 34 for non real-time delivery to the first user device 24.

With these processing actions in mind, one or more embodiments of the video IVR system 10 are configured to initiate the video call 30 to the second user device 28 as a circuit-switched video call, e.g., as a 324M video telephony call. Further, in at least one embodiment, the video IVR system 10 is configured to send video call flow information to the second user device 28, which provides, for example, an identification of the specified video content 26, and a menu for selectively accepting the video call. The video IVR system 10 thus sends the specified video content 26 if the video call 30 is accepted by the second user device 28. For example, the video IVR system 10 may send visual or audible menu information to the second user device 28 that provides for selection of the specified video content 26 by a user of the second user device 28. Here, the convenience of the interactive user support provided by the video IVR system 10 is exploited, in that the menu and interactive selection functions used generally to support conventional video calling are exploited to present the user of the second user device 28 with menus or other selection criteria for confirming his or her desire to receive the pushed video content, i.e., to receive the specified video content 26. Calling party identification information, or other information identifying the first user device 24 and information identifying the specified video content 24 may be provided to the user of the second user device 28, for use in deciding whether to accept or reject the pushed video.

As will be further detailed later herein, the video IVR system 10 or an associated web server (not shown) is, in one or more embodiments, configured to transcode the specified video content 26 (as needed) into a circuit-switched video format for delivery to the second user device 28 over the circuit-switched video call 30. As noted, the 324M standards for circuit-switched video telephony over 3G communication networks define a non-limiting example of circuit-switched video formats. In these or other embodiments, the video IVR system 10 may be configured to communicate with a web server (not shown) that is in turn communicatively coupled to the first user device 24, wherein the video IVR system 10 is configured to receive the push request 22 from the web server.

In this regard, it should be understood, then, that "receiving" the push request 22 at the video IVR system 10 encompasses receiving the push request 22 directly from the first user device 24, or indirectly from the first user device 24, such as through a web server. Indeed, the specific protocol, format and contents of the push request received at the video IVR system 10 may differ in protocol, format, etc. from the push request initially outgoing from the first user device 24. In any case, the video IVR system 10 receives a push request 22 that is initiated by or otherwise originated from the first user device 24.

Similarly, it should be understood that the video IVR system 10 sends the return video content 34 to the first user device 24 directly or indirectly. In one embodiment, the video IVR system 10 is configured to send the return video content 34 to the first user device 24 by streaming the return video content 34 to the first user device 24 in conjunction with receiving the return video content 34 from the second user device 24. This operation provides real-time or near real-time feedback, wherein the user of the first user device 24 is provided with the opportunity to watch the user of the second user device 28 as he or she views the specified video content 26. Such streaming comprises, in one or more embodiments of the video IVR system 10, sending the return video content 34 via a real-time or near real-time packet data connection established with the first user device 24. The packet data connection may be established between the video IVR system 10 and the first user device 24, or an intermediary system, such as an associated web server (not shown) may be used to support such streaming.

In another embodiment, the video IVR system 10 establishes a video call (illustrated as call 36 in FIG. 1) to the first user device 24, concurrent with its first video call 30 to the second user device 28. With this arrangement, the video IVR system 10 streams the specified video content 26 to the second user device 28 via its first video call 30 to the second user device 28, and streams the return video content 34 to the first user device 24 via its second video call 36 to the first user device 24. Optionally, the video IVR system 10 is further configured to receive at least audio information from the first user device 24 over the second video call 36, and to provide that audio information to the second user device 28 over the first video call 30. Doing so allows the user of the first user device 24 to direct comments to the user of the second user device 28, while the user of the first user device 24 watches (via feedback of the return video content 34) the user of the second user device 28 during playback of the specified video content 26.

Broadly, then, those skilled in the art will appreciate that the teachings herein contemplate a video IVR system 10 for sharing video content over one or more communication networks, where the video IVR system 10 comprises one or more processing circuits 12 configured to perform a number of supporting operations. In at least one embodiment, the processing circuits 12 are configured to receive a push request 22 initiated by a first user device 24 indicating that specified video content 26 is desired to be delivered to a second user device 28, establish a video call 30 between the video IVR system 10 and the second user device 28, and to deliver the specified video content 26 to the second user device 28 over the video call 30. Further, the processing circuits 12 are configured to receive return video content 34 from the second user device 28 over the video call 30, and send the return video content 34 to the first user device 24. The video IVR system 10 may send the return video content 34 to the first user device 24 via a packet data connection established with the first user device 24, and the video IVR system 10 may include a web server interface—e.g., a web/IP-based configuration for the push interface 14 shown in FIG. 1—for receiving the push request 22 from a web server (not shown) that is communicatively coupled to the first user device 24.

Figure 3:
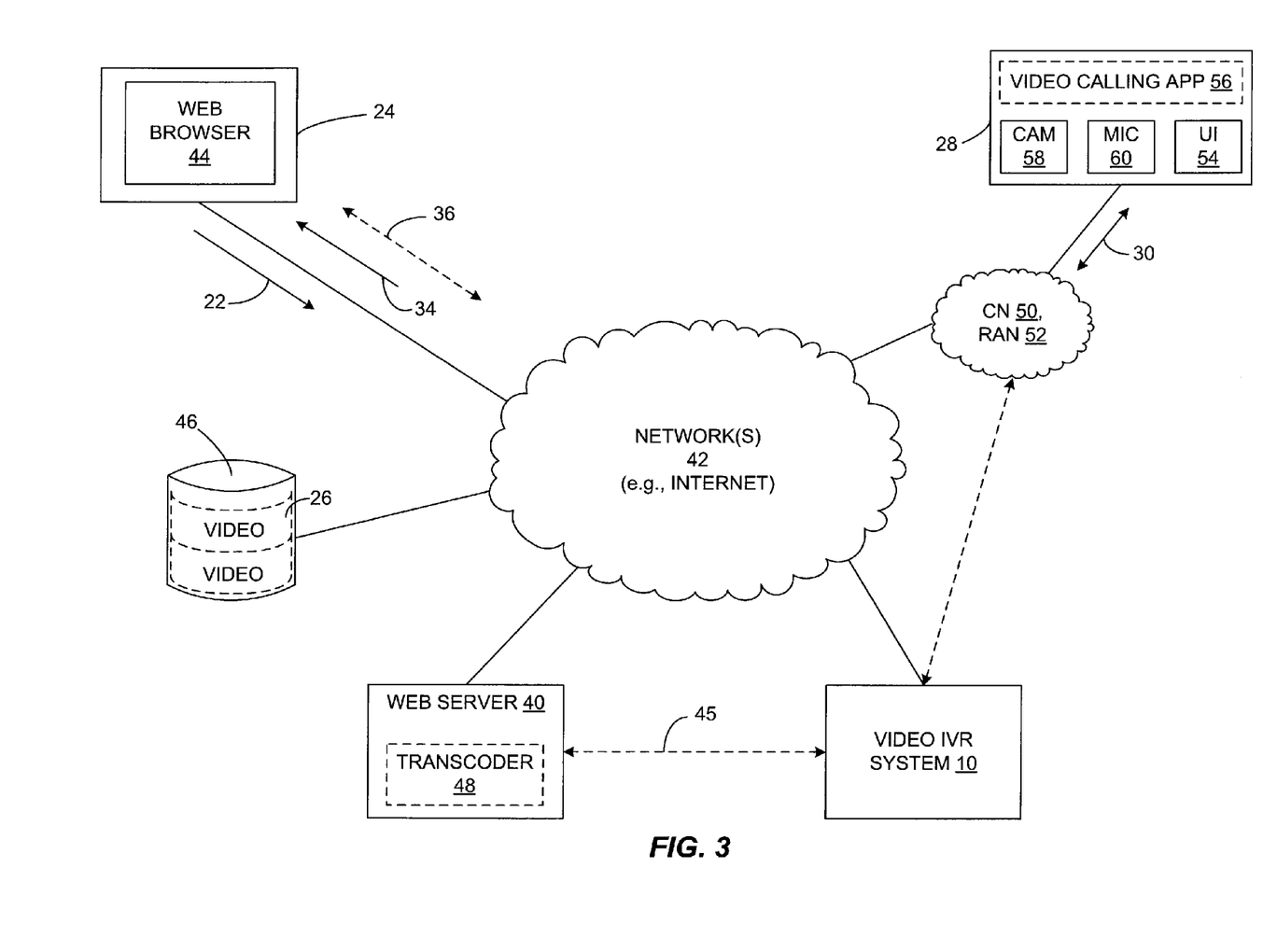
FIG. 3 is a block diagram of one embodiment of a system for interactive video sharing, including an embodiment of a video IVR system.

FIG. 3 illustrates one or more embodiments of the video IVR system 10 in an example context, wherein it is communicatively coupled to a web server 40, which in turn is coupled through one or more communication networks 42 to the first user device 24. The communication network(s) 42 may be or include the Internet, for example, and the first user device 24 in this embodiment may be, for example, a personal computer (PC) or other computing device running a web browser application 44. Note that the video IVR system 10 communicatively couples to the web server 40 through the communication network(s) 42 in one embodiment, such as where the push interface 14 of FIG. 1 is implemented as an IP interface supporting interaction with the web server 40. In other embodiments, other communication links 45, such as private IP, ISDN, etc., or other links, communicatively couple the video IVR system 10 to the web server 40.

A user of the first user device 24 (a "first user") identifies specified video content 24 that the first user believes would be of interest to the user of the second user device 28 (a "second user"). For example, the first user may find or otherwise have knowledge of prerecorded video or web stream available at a particular network address (e.g., URL), such as might be offered by a video aggregation service like YOUTUBE. In any case, in this embodiment, an accessible video source 46 provides access or otherwise links to video content, including the specified video content 26 that the first user desires to have pushed to the second user.

The web server 40, which implements HTTP-based communications for example, allows the first user to access the video push services offered by the video IVR system 10, such as by providing a web page, which may be freely accessible or restricted via login. The first user thus uses the web browser application 44 to initiate the push request 22, such as by identifying the targeted recipient and identifying the specified video content 26 to be pushed. The second user device 28 comprises, in one or more embodiments, a wireless communication device, such as a cellular radiotelephone, a PDA or pager with wireless capability, a laptop/palmtop computer, or other wireless mobile communication apparatus configured to support full-duplex video calling. As such, the first user may include the telephone number or a linked identifier in the push request 22, identifying the second user device 28. Unique user names can be used, for example, where the first and second members subscribe to a video push service. In any case, the push request 22 generally includes or is accompanied by an identifier for the specified video content 26. As noted, the video identifier may be a URL or other link to pre-recorded and/or streaming web-based video that is accessible to the web server 40 and/or accessible to the video IVR system 10.

In at least one embodiment, the web server 40 includes a transcoder circuit 48, which may be implemented in software, for example. The web server 40 is configured to receive the push request 22, and from the request obtain or otherwise link to the specified video content 26. If needed, the web server 40 transcodes the specified video content 26, e.g., it makes a transcoded copy of the specified video content 26, to put the specified video content 26 into a format compatible for video call delivery by the video IVR system 10. In other embodiments, the video IVR system 10 provides transcoding. In such embodiments, the web server 40 may be configured to pass along a copy of the specified video content 26, or may be configured to simply pass along the push request 22 to the video IVR system 10 and rely on the video IVR system 10 to link to or otherwise retrieve the specified video content 26.

Regardless of the particular variations adopted for such details, the video IVR system 10 receives the push request 22, and, in response, initiates an out-dial video call 30 to the second user device 28. Correspondingly, the video IVR system 10 is communicatively coupled to a core network (CN) 50, which in turn communicatively couples to the second user device 28 through a radio access network (RAN) 52. The CN 50 may be a circuit-switched CN (CSCN), or may be a packet-switched CN (PSCN), depending, for example, upon the wireless communication standards on which the CN 50 is implemented.

In either case, in at least one embodiment, the CN 50 includes or is associated with one or more gateway entities for communicatively coupling the CN 50 and the video IVR system 10. For example, in one embodiment, the CN 50 comprises a CSCN and the video call 30 is delivered to the second user device 28 as a circuit-switched video call. Even so, in at least one such embodiment, the CN 50 includes a video gateway entity configured for interfacing the CN 50 to the Internet. As such, it should be understood that the video IVR system 10 may send and receive full-duplex video for the video call 30 using packet-switched communications or circuit-switched communications, and that connection of the video call 30 to the second user device 28 is made by the CN 50/RAN 52 using circuit-switched or packet-switched links.

In any case, if the video call 30 is accepted by the second user, the video IVR system 10 is configured in one or more embodiments to present the second user with a video call flow or other menu/selection flow, allowing the second user to select the specified video content 26 for playback at the second user device 28. Here, it is assumed that the second user device 28 supports video telephony, at least in the sense that it is compatible with one or more protocols for use in establishing full-duplex video connections—such as 324M protocols for circuit-switched video telephony—and also in the sense that the second user device 28 (which may be an integrated or modular system) is capable of capturing video of the second user as he or she views video playback.

To that end, the second user device 28 is illustrated as including a user interface 54 (e.g., keyboard, screen, etc.), a video calling application 56 (such as for two-way video conference calling), a camera 58, and a microphone 60. The camera 58 is operable to capture the second user's image during video playback via the user interface 54, meaning that the second user's reaction to the specified video content 26 can be captured during playback of the specified video content 26 at the second user device 28. (Those skilled in the art will appreciate that "video content" as used herein is not meant to imply that audio information is not captured and/or transmitted in conjunction with visual information. Indeed, the microphone 60 may capture verbalizations made by the second user during playback of the specified video content 26.)

One sees with the above arrangement that the first user can initiate a video push of specified video content 26 to a targeted second user, by sending a push request 22 to the video IVR system 10. Responsive to that request, the video IVR system 10 initiates an out-dial video call 30, e.g., a standards-compliant circuit-switched video call, to the second user device 28. Advantageously, the video IVR system 10 uses the video call 30 to deliver the specified video content 26 and to receive return video content 34 that allows the first user to observe the second user's reactions during the second user's playback of the pushed video. That feedback of the second user's reaction to the pushed video content substantially enhances the sharing experience for both users. Thus, the video IVR system 10 in one or more embodiments implements a method of sharing video content over one or more communication networks that includes receiving a push request 22 initiated by a first user device 24 targeting delivery of specified video content 26 to a second user device 28, establishing a video call 30 to the second user device 28, delivering the specified video content 26 to the second user device 28 and receiving return video content 34 from the second user device 28 over the video call 30, and sending the return video content 34 to the first user device 24.

In carrying out such processing, the video IVR System 10 addresses the lack of meaningful communication and feedback in conventional approaches to sharing video content. In at least one embodiment, the video IVR system substantially enhances video sharing by real-time delivering the tagged media (the specified video content 24) as a circuit switched video push to a targeted user or, for mobile-to-mobile use cases, delivering pushed video content and feedback return video content to both the pushing user and the targeted user.

In at least one such embodiment, the video IVR system 10 functions as a messaging system that essentially performs a video out-dial and streams transcoded media onto the recipient's 3G telephone display while simultaneously capturing the recipient's reaction to the video playing back and feeding this return video information back to the sender's display screen. If the sender is a mobile user, the reaction video (the return video content 34) is forwarded via the messaging system to the sending user as a circuit switched video. Further, if the use case involves sharing streamed video content between two mobile users, the messaging system can be configured to stream the same transcoded media onto both parties' 3G telephone displays, allowing them to watch together.

As shown in FIG. 3, the above functionality may be implemented by a video IVR system 10 connected to a web server 40 and a web browser client 44, wherein the web server 40 fetches external and/or internal media to transcode and push to a recipient device via the IVR system 10. Correspondingly, the browser client 44 receives a real-time or near real-time return video stream from the recipient's device. Of course, the implementation features provided by practicing such a sharing method may exploit the particular use case involved.

For a first use case, and with reference back to FIG. 3, one may assume that the sending device (i.e., the first user device 24) is a PC and that the recipient device (i.e., the second user device 28) is a mobile phone (e.g., smart phone, pocket PC, etc.). In such a use case, the video IVR system 10 and/or the web browser 40 may be configured to implement a passive feedback stream, or an active feedback stream. ("Feedback stream" as used here refers to the return video content 34 coming from the recipient device.)

Passive feedback stream implementations require the device originating the push request 22 to receive incoming video data on an open port, which may be specified by it in the push request 22. This passive transfer method offers several advantages over active feedback stream implementations. For example, the passive feedback allows the video IVR system 10 to be shielded from the Internet, thereby simplifying its implementation. (For example, the web browser 40 can use communications link 45 to communicate with the video IVR system 10 via a compatible communications protocol, rather than having to configure the video IVR system 10 for Internet-based communications with the web browser 40.)

Further, with passive stream implementations, the video IVR system 10 can send the return video content 34 using User Datagram Protocol (UDP), which avoids active connection overhead. That is, the return video content 34 can be streamed from the video IVR system 10 using RTP over UDP. With such an implementation, the video IVR system 10 generally always sends the return video content 34 as part of its video push operations.

For discussion of an example passive streaming use case, assume that the first user is associated with the first user device 24, and that it originates the push request 22. Further, assume that the second user is associated with the second user device 28, and that it receives the specified video content 26 as the pushed video and returns the return video content 34 to the IVR system 10 for feedback to the first user.

With these assumptions, an example of interactive video sharing through (IVR-based) video push processing begins with the first user selecting a video and initiating a video push. The first user may, for example, be engaged in web browsing and discover a video that he or she believes will be of interest to the second user. In any case, the first user may initiate the video push by interacting with the web server 40 through the web browser application 44 running the first user device 24.

In one embodiment, a JAVA applet, plug-in, etc., is loaded by the first user's browser 44 and provides the first user with the ability to initiate a video push request 22. For this passive streaming case, the applet can be configured to detect an available port, and can be configured to include the IP address of the selected video and the port identifier in the push request 22 sent to the web server 40. After sending the push request 22, the applet begins listening for an incoming RTP stream on the indicated port in anticipation of receiving the return video content 34 from the video IVR system 10.

The web server 40 transcodes the video to be pushed into an IVR/3G format for delivery by the video IVR system 10 as the specified video content 26, and initiates an out-dial from the video IVR system 10 to the second user device 28. This action may be regarded as indirectly providing the push request 22 from the first user device 24 to the video IVR system 10. In response, the video IVR system 10 retrieves the (transcoded) specified video content 26 from the web server 40 and dials the number of the second user device 28. Upon the second user device 28 accepting the incoming video call 30, the video IVR system 10 presents a call flow leading to the specified video content 26.

During playback of the specified video content 26 to the second user, the video IVR system 10 receives the incoming video from the second user device 28 and sends it as the return video content 34 to the applet of the first user device 22 using RTP over UDP. Of course, the video IVR system 10 need not stream the return video content 34 concurrent with playback of the specified video content 26 at the second user device 28. For example, in at least one embodiment, the video IVR system 10 records or otherwise stores the return video content 34 and sends it in an e-mail message to the first user device 24 at or after playback of the specified video content 26 completes.

Turning to active stream details, it should be noted that active streaming techniques generally require the client (first user device 24) to actively connect to the video IVR system 10 to receive the video stream carrying the return video content 34. Despite the attendant connection overhead, one advantage is that the video IVR system 10 does not stream back the return video content 34 absent an active connection by the first user device 24. Of course, supporting such connections does require that the video IVR system 10 be accessible by the first user device 24, such as via the Internet, and such streaming may require more complex streaming techniques.

An example use case for active streaming includes a number of processing operations, beginning with the first user selecting a video as the specified video content 26 and initiating a video push based on interacting with the web browser 40 via the browser application 44 (or another software program) running on the first user device 24. In response, the web server 40 transcodes the specified video content 26 into an IVR/3G format and initiates an out-dial from the video IVR system 10 to the selected second user device 28. Additionally, the video IVR system 10 retrieves the transcoded version of the specified video content 26 from the web server 40 and dials the second user's number. Upon the second user accepting the incoming video call 30, the video IVR system 10 presents a call flow leading to the specified video content 26.

In support of providing feedback video of the second user's response to viewing the specified video content 26, the video IVR system 10 specifies to the web server 40 what port the first user device 24 should connect to, and the web server 40 sends this information to the JAVA applet, FLASH movie, or other client application, applet, plug-in, etc. running at the first user device 24. In one contemplated arrangement, a JAVA applet for FLASH movies loaded by the browser application 44 running at the first user device 24 connects to the video IVR system 10 and receives a video stream carrying the return video content 34 from the second user device 28. In at least one embodiment, the video IVR system 10 records the return video content 34 and streams it as a FLASH movie or other video feed to the first user device 24. Also, as mentioned earlier, the video IVR system 10 is in at least one embodiment configured to record or otherwise store the return video content 34, and send it to the first user device 24 in an e-mail message.

Another example use case is based on the assumption that both the first user device 24 and the second user device 28 are mobile telephones or other such wireless communications devices, each supporting video calling. An example of processing in such a scenario includes the first user selecting a video, and initiating a video push of that video by sending a push request 22 to the web server 40 via a browser application 44 or the like. In response to the push request 22, the web server 40 transcodes the video identified in the push request 22 into an IVR/3G format, and initiates two out-dials from the video IVR system 10, with one out-dial video call directed to the second user device 28 (e.g., video call 30) and one out-dial call directed to the first user device 24 (e.g., video call 36). The video IVR system 10 retrieves the transcoded video from the web server 40 as the specified video content 26 and dials the respective numbers for the first and second user devices 24 and 28 (which may be done as part of the preceding out-dial initiating step). Upon the first user answering the incoming video call 36 and upon the second user accepting the incoming video call 30, the video IVR system 10 presents a call flow to the second user leading to the specified video content 26, which is streamed to the second user device 28.

During playback of the specified video content 26 to the second user, the video IVR system 10 forwards the return video content 34 from the second user device 28 to the first user device 24 via the video call 36 established between the video IVR system 10 and the first user device 24. The video IVR system 10 may be configured to drop incoming video from the first user device 24, as the outgoing leg of the video call 30 established with the second user device 28 is used in this example case for delivering the specified video content 26 rather than for delivering video from the first user device 24. However, in at least one embodiment, during the playback of the specified video content 26 to the second user, audio comments from the first user may be forwarded in real-time to the second user by the video IVR system 10 via its use of an audio channel in the video call 30.

Further, in at least one embodiment the video IVR system 10 begins forwarding video from the first user to the second user instead of dropping it, upon playback completion of the specified video content 26 at the second user device 28. In such configurations, the video incoming to the video IVR system 10 on the video call 36 is switched over or otherwise forwarded as outgoing video on the video call 30. See FIG. 3 for reference to the video call 30 established by the video IVR system 10 with the second user device 28, and to the video call 36 established by the video IVR system 10 with the first user device 24.

Similarly, video incoming to the video IVR system 10 from the second user device 28 can be forwarded or otherwise switched over to the outgoing video leg of the video call 36. In this manner, the video IVR system 10 establishes a "normal" video call between the first user device 24 and the second user device 28 upon completion of playback of the specified video content 26 at the second user device 28.

In another embodiment, the video IVR system 10 provides the first user device 24 with the specified video content 26 and with return video content 34 from the second user device, and provides the second user device 28 with the specified video content 26, along with video from the first user device 24. More particularly, the video IVR system 10 is extended with capabilities to mix several video sources into n×n screen layouts. Correspondingly, the video IVR system 10 is configured to send the second user device 28 both the specified video content 26 and the incoming video from the first user device 24 and/or the video IVR system 10 sends both the specified video content 26 and the return video content 34 to the first user device 24.

Such an arrangement allows the second user, for example, to see both the specified video content 26 concurrent with video captured by the first user device 24. Likewise, such a configuration allows the first user to view the specified video content 26 along with the second user, at the same time he or she views the return video content 34 from the second user device 28. Simply, the multiple video feeds and split screen arrangement supported by the video IVR system 10 allows both the first and second users to see each other whilst both simultaneously view the specified video content 26. Note that as a further enhancement to this configuration and/or with other configurations, the video IVR system 10 manipulates the calling line identity for the first user and sends such information to the second user as part of the video call 30.

Yet another example use case involves an embodiment of the video IVR system wherein it is configured to provide video sharing based on making two outbound video calls, e.g., the video call 30 to the second user device 28 and video call 36 to the first user device 24, as shown in FIG. 3. Example processing in such a scenario involves the first user selecting a video and initiating a video push, such as by sending a push request 22 to the web server 40 via the web browser application 44. In response, the web server 40 transcodes the video into an IVR/3G format, and initiates two out-dial video calls from the video IVR system 10, one to the second user selected as the recipient for the specified video content 26 and one to the first user as the initiator of the push request 22.

In response to this push request initiation, the video IVR system 10 retrieves the transcoded video from the web server 40, and dials the first and second users' numbers. Upon acceptance of the video calls by the first and second users, the video IVR system 10 presents a call flow leading to the specified video content 26 which is streamed towards both the first and second user over their respective video calls. Doing so allows both the first and second users simultaneously to have the specified video content 26 played back to them by their respective user devices 24 and 28. In at least one such embodiment, the video IVR system 10 drops the incoming video from both the first and second users, at least until the playback of the specified video content completes.

Further, in at least one embodiment, the video IVR system 10 is configured to send audio from the first user device 24 to the second user device 28 and vice versa, thus allowing the first and second users to share audio comments while viewing the specified audio content 26. The video IVR system 10 is configured to forward audio comments between the first and second user devices 24 and 28 in real-time over audio channels available in the respective video calls established between the video IVR system 10 and the first and second user devices 24 and 28.

In the same or other embodiments, the video IVR system 10 is configured to transfer video (as well as audio) between the first and second user devices 24 and 28 after playback of the specified video content 26 completes. In this sense, the video IVR system 10 sends the specified video content 26 to both users and then switches their video feeds to transfer between them, thereby establishing a "normal" video call connection through the video IVR system 10 as between the first user device 24 and the second user device 28.

Of course, as noted for an earlier-described embodiment, the video IVR system 10 can be configured to mix more than one video source. Accordingly, in at least one embodiment contemplated herein for the video IVR system 10, the video IVR system 10 mixes video captured by the second user device 28 with the specified video content 26, and provides that mixed video stream to the first user device 24. Thus, rather than simply receiving return video content 34 from the second user device 28, the first user device 24 receives a mixed video stream that allows the first user to watch playback of the specified video content 26, whilst simultaneously watching the second user as he or she views the specified video content 26. Similarly, the video IVR system 10 provides the second user device 28 with a mixed video feed that includes the specified video content 26 as well as video from the first user device 24. As such, the second user sees the first user as they are both viewing the specified video content 26.

Further, in at least one such embodiment of the video IVR system 10, it is configured to automatically switch back to 1×1 screen layout to exchange the video between the first and second users upon ending of playback of the specified video content 26. Still further, as playback of the specified video content 26 ends, the first user can use the concurrent packet-switched connection of the first user device 24 to select another video to push. Also, as described for an earlier embodiment, the video IVR system 10 can be configured to manipulate the calling line identity of the first user and send calling line identity information via the video call to the second user.

With the above use cases and other example information presented herein, those skilled in the art will appreciate that the teachings herein provide, in at least one embodiment, a method of instructing a video IVR system 10 to download, transcode and outdial-push internet video files hosted on external web services, under the control of a subscriber's internet browser. These teachings further provide a method of enabling a video IVR system 10 to perform the synchronized streaming of media, e.g., return video content 34, from a phone or other device to one or more (web-based) clients, regardless of the involved proxies and firewalls.

These teachings thus allow a video IVR system 10 to make a video call out-dial to a third party and entertain that third party by pushing specified video content to them over the video call. Complementing that entertainment, the video IVR system 10 provides for the capturing of return video from the recipient third-party's device camera. In at least one such embodiment, the video IVR system 10 provides this return video to the party that initiated the video push by converting the return video into multiple segment files and sending those files to the sending party's device to be concatenated and played within a Flash player as a quasi real-time video of the recipient third-party's reaction to their viewing of the pushed video.

Further, in one or more of its embodiments, the methods presented herein contemplate allowing the party originating the video push to type a message to the recipient party, e.g., from an application running on the sending party's device, wherein the video IVR system 10 is configured to render the typed message into a dynamic prompt to be played at the recipient party's device during the video push. Note, too, that the teachings herein contemplate the embedding of metadata into the media tagged for video pushing.

As such, it should be understood that the foregoing description and the accompanying drawings represent non-limiting examples of the methods, systems, and individual apparatuses taught herein. The present invention therefore is not limited by the foregoing description and accompanying drawings. Instead, the present invention is limited only by the following claims and their legal equivalents.

What is claimed is:

1. A method of sharing video content over one or more communication networks comprising:
   receiving by an Interactive Voice Recorder (IVR) system a push request initiated by a first user device requesting delivery of specified pre-existing video content to a second user device that is configured to support video calls, wherein said push request includes a link to the specified pre-existing video content and a phone number associated with the second user device, wherein the IRV system is communicatively coupled to the first user device and the second user device;
   initiating a video call to the second user device responsive to said push request using the phone number included in said push request, said video call comprising a full-duplex communication between the second user device and the IVR system;
   accessing the link to the specified video content and play the specified video content by the IVR system to the second user device over an outgoing leg of the full-duplex communication, if the second user device accepts the video call; and
   receiving video feedback from the second user device over an incoming leg of the full-duplex communication, said video feedback being captured by the second user device during playback of the specified video content; and
   sending the video feedback to the first user device.

2. The method of claim 1, wherein initiating the video call to the second user device comprises initiating a circuit-switched video call to the second user.

3. The method of claim 1, wherein initiating the video call to the second user device comprises initiating a packet-switched video call to the second user.

4. The method of claim 1, wherein delivering the specified video content to the second user device includes sending video call flow information to the second user device providing for selection of the specified video content by a user of the second user device.

5. The method of claim 1, further comprising transcoding the specified video content into a circuit-switched video format for delivery to the second user device over the circuit-switched video call.

6. The method of claim 1, wherein receiving a push request initiated by a first user device comprises receiving the push request from a web server communicatively coupled to the first user device.

7. The method of claim 6, wherein sending the return video content to the first user device comprises streaming the return video content to the first user device in conjunction with receiving the return video content from the second user device.

8. The method of claim 7, wherein streaming the return video content to the first user device comprises sending the return video content via a real-time or near real-time packet data connection established with the first user device.

9. The method of claim 7, wherein the video call with the second user device is considered a first video call and further comprising establishing a second video call concurrent with the first video call, said second video call established with the first user device, streaming the return video content to the first user device via the second video call, receiving audio content from the first user device via the second video call, and sending the audio content to the second user device via the first video call.

10. A method of sharing video content over one or more communication networks comprising:
   receiving by an Interactive Voice Recorder (IVR) system a push request initiated by a first user device targeting delivery of specified pre-existing video content to a second user device, wherein said push request includes a link to the specified pre-existing video content and a phone number associated with the second user device, wherein the IVR system is communicatively coupled to the first user device and the second user device;
   establishing a video call to the second user device in response to said push request using the phone number included in said push request, said video call comprising a full-duplex communication between the second user device and the IVR system;
   accessing the link to the specified video content and playing the specified video content by the IVR system to the second user device over an outgoing leg of the full-duplex communication, and receiving video feedback from the second user device over the video call over an incoming leg of the full-duplex communication, said video feedback being captured by the second user device during playback of the specified video content; and
   sending the video feedback to the first user device.

11. The method of claim 10, wherein sending the return video content to the first user device comprises sending the return video content to the first user device via a packet data connection established with the first user device.

12. The method of claim 10, wherein receiving the push request from the first user device comprises receiving the push request from a web server communicatively coupled to the first user device.

13. A video interactive voice response (IVR) system configured to support the sharing of video content over one or more communication networks, said video IVR system comprising one or more processing circuits configured to:
   receive by the IVR system a push request initiated by a first user device requesting delivery of specified pre-existing video content to a second user device that is configured to support video calls, wherein said push request includes a link to the specified pre-existing video content and a phone number associated with the second user device, wherein the IVR system is communicatively coupled to the first and second user device;
   initiate a video call to the second user device responsive to said push request using the phone number included in said push request, said video call comprising a full-duplex communication between the second user device and the IVR system;
   accessing the link to the specified video content and play the specified video content by the IVR system to the second user device over an outgoing leg of the full-duplex communication, if the second user device accepts the video call; and
   receive return video feedback from the second user device over an incoming leg of the full-duplex communication, said video feedback being captured by the second user device during playback of the specified video content; and
   send the video feedback to the first user device.

14. The video IVR system of claim 13, wherein the video IVR system is configured to initiate the video call to the second user device as a circuit-switched video call.

15. The video IVR system of claim 13, wherein the video IVR system is configured to initiate the video call to the second user device as a packet-switched video call.

16. The video IVR system of claim 13, wherein the video IVR system is configured to send video call flow information to the second user device, if the video call is accepted by the second user device, that provides for selection of the specified video content by a user of the second user device.

17. The video IVR system of claim 13, wherein the video IVR system or an associated web server is configured to transcode the specified video content into a circuit-switched video format for delivery to the second user device over the circuit-switched video call.

18. The video IVR system of claim 13, wherein the video IVR system is configured to communicate with a web server that is in turn communicatively coupled to the first user device, and wherein the video IVR system is configured to receive the push request from the web server.

19. The video IVR system of claim 18, wherein the video IVR system is configured to send the return video content to the first user device by streaming the return video content to the first user device in conjunction with receiving the return video content from the second user device.

20. The video IVR system of claim 19, wherein the video IVR system is configured to stream the return video content to the first user device by sending the return video content via a real-time or near real-time packet data connection established with the first user device.

21. The video IVR system of claim 19, wherein the video call with the second user device is considered a first video call and wherein the video IVR system is further configured to establish a second video call concurrent with the first video call, said second video call established with the first user device, stream the return video content to the first user device via the second video call, receive audio content from the first user device via the second video call, and send the audio content to the second user device via the first video call.

22. A video interactive voice recorder (IVR) system for sharing video content over one or more communication networks, said video IVR comprising one or more processing circuits configured to:

receive by the IVR system a push request initiated by a first user device indicating that specified pre-existing video content is desired to be delivered to a second user device, wherein said push request includes a link to the specified pre-existing video content and a phone number associated with the second user device, wherein the IVR system is communicatively coupled to the first and second user device;

establish a video call between the video IVR system and the second user device using the phone number included in said push request, said video call comprising a full-duplex communication between the second user device and the IVR system;

accessing the link to the specified video content and play the specified video content by the IVR system to the second user device over an outgoing leg of the full-duplex communication, and receive video feedback from the second user device over the video call over an incoming leg of the full-duplex communication, said video feedback being captured by the second user device during playback of the specified video content; and send the video feedback to the first user device.

23. The video IVR system of claim 22, wherein the video IVR system is configured to send the return video content to the first user device via a packet data connection established with the first user device.

24. The video IVR system of claim 22, wherein the video IVR system includes a web server interface for receiving the push request from a web server that is communicatively coupled to the first user device.

\* \* \* \* \*

UNITED STATES PATENT AND TRADEMARK OFFICE
CERTIFICATE OF CORRECTION

| | |
|---|---|
| PATENT NO. | : 8,539,354 B2 |
| APPLICATION NO. | : 12/059705 |
| DATED | : September 17, 2013 |
| INVENTOR(S) | : Beswick et al. |

It is certified that error appears in the above-identified patent and that said Letters Patent is hereby corrected as shown below:

In the Specification

In Column 4, Line 26, delete "video content 24" and insert -- video content 26 --, therefor.

In Column 4, Line 35, delete "3 G" and insert -- 3G --, therefor.

In Column 5, Line 63, delete "video content 24" and insert -- video content 26 --, therefor.

In Column 7, Line 59, delete "video content 24)" and insert -- video content 26) --, therefor.

In Column 9, Line 20, delete "user device 22" and insert -- user device 24 --, therefor.

In the Claims

In Column 13, Line 10, in Claim 1, delete "IRV" and insert -- IVR --, therefor.

Signed and Sealed this
Eighth Day of July, 2014

Michelle K. Lee
*Deputy Director of the United States Patent and Trademark Office*